United States Patent [19]
Corcoran

[11] Patent Number: 4,613,171
[45] Date of Patent: Sep. 23, 1986

[54] JUNCTION COUPLING WITH UNITARY LOCKING GASKET AND METHODS FOR THEIR USE

[76] Inventor: Daniel P. Corcoran, 709 Webb Dr., Bay City, Mich. 48706

[21] Appl. No.: 662,238

[22] Filed: Oct. 18, 1984

[51] Int. Cl.⁴ ............................................. F16L 41/00
[52] U.S. Cl. .................................... 285/197; 285/199; 285/910; 277/212 F
[58] Field of Search ............... 285/197, 198, 199, 180, 285/309, DIG. 11; 251/146; 277/212 F; 403/234, 235, 236, 237

[56] References Cited

U.S. PATENT DOCUMENTS

| 1,178,234 | 4/1916 | Hayden | 285/339 |
| 1,791,385 | 2/1931 | Skuttle | 285/197 |
| 2,700,774 | 2/1955 | Smith | 285/DIG. 11 |
| 2,826,435 | 3/1958 | Schustack | 285/199 |
| 3,292,954 | 12/1966 | Corey | 285/420 |
| 3,999,785 | 12/1976 | Blakeley | 285/111 |
| 4,073,513 | 2/1978 | Blakeley | 285/197 |
| 4,157,195 | 6/1979 | Costanzo | 285/4 |

FOREIGN PATENT DOCUMENTS

| 764401 | 5/1934 | France | 285/197 |
| 2333190 | 6/1977 | France | 285/197 |
| 388044 | 5/1965 | Switzerland | 285/197 |

Primary Examiner—Cornelius J. Husar
Assistant Examiner—Eric K. Nicholson
Attorney, Agent, or Firm—Robert L. McKellar

[57] ABSTRACT

What is disclosed is a novel unitary locking gasket for use with a junction coupling to obtain a leak-proof mechanical pipe connector. Also disclosed is the use of the gasket to provide a junction in a main conduit. The gasket is designed to allow full rubber gasketing between the pipe and a metal spigot of the gasket.

17 Claims, 6 Drawing Figures

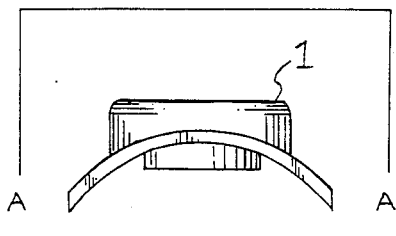
FIG. 1
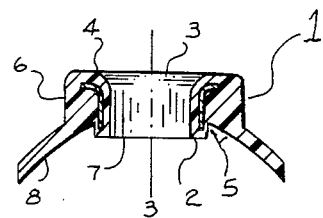
FIG. 2
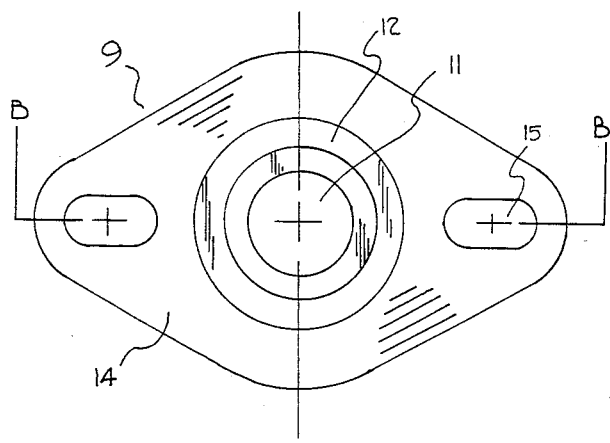
FIG. 3
FIG. 4
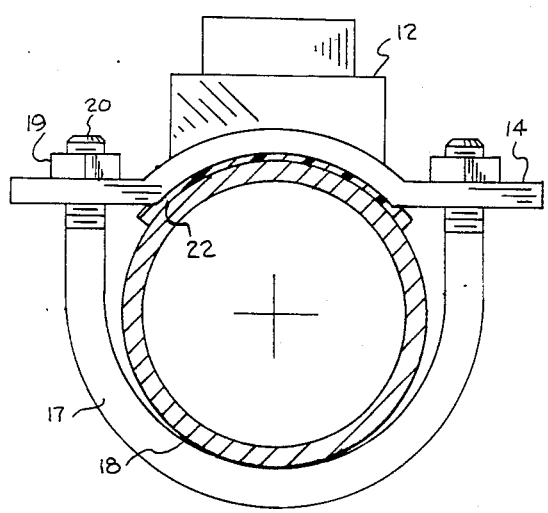
FIG. 5
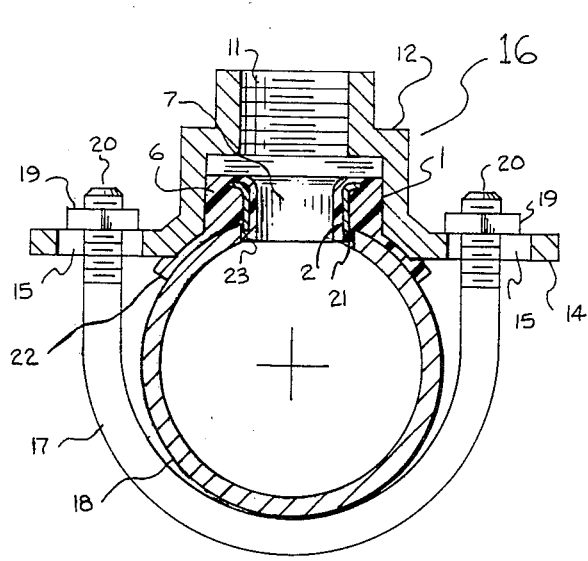
FIG. 6

JUNCTION COUPLING WITH UNITARY LOCKING GASKET AND METHODS FOR THEIR USE

BACKGROUND OF THE INVENTION

This invention deals with a means of providing a branch point in a pipe or conduit. More specifically, this invention deals with a means of providing a leak-proof mechanical attachment to a pipe used for fluid transport. This invention also deals with a means of providing a branch point for conduit, such as electrical or telephone wire conduit, so that quick, efficient means can be utilized to change existing conduit systems to meet the demands of relocation of electrical service and telephone service.

Conventional means of providing such attachments have included a shutdown of the system, the cutting of the system and the insertion of tees and securing such tees by welding or threading the pipe. The long interruption of service, as well as the labor required for such changes, is expensive and especially so where the system being refurbished is an older system which has been installed without regard to possible repair or change.

More modern devices have been developed which allow for the efficient establishment of branch points on a main pipe system. Such devices are, for example, the device disclosed by Carey in U.S. Pat. No. 3,292,954, issued Dec. 20, 1966. This device is a service clamp, having as its main themes, a novel clamping part, a holding part and a connecting part. The device fits the surface of a pipe but does not intrude into the pipe. The sealing system is a conventional elastomeric O-ring which lays flat on the surface of the pipe and takes on the contour of the pipe as the device is secured to the pipe.

A further device is disclosed in U.S. Pat. No. 3,999,785, issued to James Blakely on Dec. 28, 1976. The essence of the Blakely patent is a novel pressure sensitive gasket. There is provision in the device for a metal spigot which is insertable in an aperture in a pipe. Before the spigot is inserted in the aperture, the gasket is slipped over the spigot and the combination helps align the pipe and allegedly prevents leaks from the connection. It should be noted that the gasket is a surface gasket and does not enter the aperture in the pipe. It lays on the surface of the pipe and is designed in a saddle shape to fit the contour of the pipe. Tabs are provided on the gasket to keep it secure in the mechanical pipe outlet and to allegedly prevent the gasket from misaligning while being placed and secured.

Yet another prior art device is one disclosed by J. G. Hayden in U.S. Pat. No. 1,178,234, issued Apr. 4, 1916. Hayden describes a pipe saddle having a spigot which is insertable in the aperture of a pipe. This apparatus has an O-ring type of gasket which lays on the surface of the pipe and is compressed to the contour of the outer surface of the pipe when the device is clamped in place. There is no gasketing of the spigot in the aperture.

Finally, there is a device described in U.S. Pat. No. 4,157,195, issued June 5, 1979. This device is a C-shaped device which has a spigot and which is alleged to be efficient in installation. The device uses a surface gasket similar to that described in U.S. Pat. No. 3,999,785, noted supra. As in the '785 patent, the gasket described in the '195 patent is a designed, surface gasket which does not gasket the spigot of the device in the aperture.

In spite of the allegations in the above enumerated disclosures, there still exists a need for a truly leak-proof device which can be quickly and efficiently installed to provide a branch point in a pipeline or conduit system.

SUMMARY OF THE INVENTION

The present invention deals with solutions to the existing problems of the prior art devices. Thus, the instant invention consists of a novel unitary locking gasket; the gasket and a junction coupler in combination; a method for their use in obtaining a leak-proof connector, and a method of providing a junction in a main conduit using the novel gasket.

Thus, the present invention deals with a novel locking gasket whose structure is unitary. The gasket is so-constructed and so-designed as to allow a full gasketing of the connector at the pipe interface and to allow the gasketing of the spigot upon insertion into the aperture of a pipe. The result is a unique self-aligning gasketing system which locks in place and which provides long-lasting, leak-proof connections.

The gasket of this invention is used in combination with a junction coupler which is designed to accept the gasket, provide for a screw-threaded bore to allow the insertion of the branch pipe or a sprinkler head and which provides the attachment means so that the gasket and junction coupling can be secured to a pipe or conduit.

The invention further comprises a mechanical pipe connector which is the unitary locking gasket, the junction coupler and a securing means for the junction coupler.

Yet another aspect of the invention is a method of obtaining a leak-proof mechanical pipe connection which method comprises the use of the gasket, junction coupler and securing means noted supra.

Still another aspect of this invention is a method of providing a junction in a main conduit such that electrical or telephone conduit can be entered and a branch point inserted.

BRIEF DESCRIPTION OF THE DRAWINGS

FIG. 1 is a side view of the unitary locking gasket.

FIG. 2 is sectioned view of the unitary locking gasket where the section is taken through the line AA of FIG. 1.

FIG. 3 is a full top view of the junction coupling.

FIG. 4 is a sectioned view of the junction coupling which is a vertical section at the center point of the threaded bore hole.

FIG. 5 is a full view of the gasket, the junction coupling and the securing means in place on a pipe.

FIG. 6 is an end view of a pipe showing the cross-section of the pipe, the gasket, the junction coupling and securing means.

DESCRIPTION OF THE PREFERRED EMBODIMENTS

Referring now to the drawings in which like-numbers indicate like-parts or pieces, there is shown in FIGS. 1 and 2 a unitary locking gasket 1 which is comprised of a compressable tube 2 which is made from a metal, metal alloy or deformable plastic. The tube 2 had a flared end 4. By "compressable" it is meant, for purposes of this invention, that the tube can be compressed with the pressure normally exerted by a device such as the junction coupler of this invention which will deform the tube. The metal, metal alloy or plastic will return to its original shape upon the release of any pressure exerted. This compressability allows for a tight fit in the recess of the hub of the junction coupler. This compressability is further helped by the elastomeric nature of the gasket which will be explained infra. The unitary locking gasket is comprised of the tube and an elastomeric housing 5 which surrounds and encapsulates the entire tube. The elastomeric housing 5 comprises an elastomeric annulus 6 which is beveled inwardly at the flared end to essentially conform to the flared end 4 of the tube 2. It should be noted at this point that the elastomeric housing totally encases the tube 2 including the flared end 4. The tube 2 continues through the elastomeric housing to form a spigot 7 which essentially extends beyond the elastomeric annulus 6. The spigot end of the tube 2 is also totally encased in the elastomeric housing 5. The tube 2 and the elastomer encased around the tube together have a lesser outer diameter than the outer diameter of the elastomeric annulus 6. This ensures easy insertion of the encased spigot 7 into the aperture of the pipe to be fitted with junction coupling. The gasket also consists of a flat annular elastomeric gasket 8 which depends from the intersection point of the elastomeric annulus 6 with the spigot 7. This flat annular elastomeric gasket 8 has a saddle shape which allows the unitary locking gasket to fit the exterior contour of the pipe to which it is to be fitted.

Typically, the elastomeric annulus 6 of the gasket is inserted in the recessed area 13 of the hub 12 (see FIG. 4), to be described infra, and enough pressure is applied to seat the elastomeric annulus 6 in the recess. The saddle of the unitary locking gasket 1 is aligned saddle for saddle with the junction coupling 9 during this operation.

The junction coupling 9 shown in FIGS. 3 and 4 is the retainer device which compresses and holds the unitary locking gasket 1 in place. The junction coupling 9 is comprised of cast metal or some similar material used in the art. As compared to the prior art devices, the junction coupling 9 does not have a spigot but instead has a recessed area in a hub. The junction coupling 9 has an inner face 10 which corresponds essentially to the outer curvature of a pipe in a saddle configuration. The junction coupling 9 has a central screw-threaded bore 11 which extends through the top of the saddle configuration and into a hub 12. The hub 12 has a recessed area 13 on its underside. This recessed area 13 is centrally disposed relative to the bore 11. The hub 12 has at its base and extending in a lateral direction from the base, a flange 14. This flange contains apertures 15 which are designed to receive bolt ends which are part of a securing means for a pipe connector. Using a fixing and stabilizing means such as a U-bolt, the apparatus is affixed to a pipe. Thus in FIGS. 5 and 6, there is shown a pipe 18 resting in a U-bolt 17 which has threaded ends 20 and which has threaded nuts 19.

During assembly in a preferred method, an aperture 21 is created in the pipe 18; the unitary locking gasket 1 is then inserted in the recessed area 13 of the hub 12 of the junction coupling 9 and seated with finger pressure. The combination of the unitary locking gasket 1 and junction coupling 9 are then placed on the pipe 18 such that the spigot 7 sets in the aperture 21 with the saddle configuration of the unitary locking gasket 1 in synchronization with the saddle configuration of the junction coupling 9 and the outside curvature of the pipe 18. The U-bolt 17 is then inserted through the apertures 15 in the flange 14 of a junction coupling 9, the nuts 19 are turned on and then down to compress the unitary locking gasket 1.

The compression causes the reduction of the diameter of the elastomeric annulus 6 of the unitary locking gasket 1 and a slight compression on the tube 2, which results in a back pressure which when combined with the back pressure of compression of the elastomeric annulus 6, causes the unitary locking gasket 1 to lock into place in the hub 12 of the junction coupling 9. When the junction coupling 9 is removed, the unitary locking gasket 1 cannot be removed from the junction coupling 9 unless exceptional force is used.

This arrangement allows a tight, leak-proof seal at the interface 22 of the gasket and the outer curvature of the pipe 18 and a tight, leak-proof seal at the interface 23 of the spigot 7 and the aperture 21 of the pipe 18.

The tube 2 is constructed from any metal or plastic which is durable enough to form a stable spigot 7. Thus, generally, the spigot 7 need only be durable enough to hold the rubber elastomeric encasement from collapsing when the pipe on which it is used is pressurized by fluids or air. If the rubber encasement collapses, it is obvious that the rubber encasement would plug the spigot 7 and prevent the junction coupler from functioning in the desired manner.

The elastomeric material which encases the tube 2 can be any elastomeric material as long as it holds its shape when once formed. Such materials are organic rubbers, silicone rubbers and silicone-modified organic rubbers. Most preferred are silicone-organic blends or copolymers. When this invention is used in a chemical atmosphere, it is sometimes preferred that the elastomeric material be oil and solvent resistant. When this invention is used for piping for chemicals, it is preferred that the elastomeric material be chemical resistant.

The junction coupler and the securing means are manufactured from metal, usually cast iron. It is possible however to use lighter weight metals such as aluminum, that is, in electrical conduit or telephone conduit and in fluid transmission lines wherein low pressures are used.

It is contemplated within the scope of this invention that the central screw-threaded bore of the junction coupling, even though illustrated as a ½ inch threaded bore, can be any size to accommodate the standard sizes of pipe and sprinkler heads. Thus, the bore can even be larger than the diameter of the hub if it is desired to attach a larger pipe to the smaller pipe.

Whenever the word "threaded" is used herein, it refers to normal conventional threads and also grooved connections.

That which is claimed is:

1. A unitary locking gasket, comprising a compressable tube which tube forms a center bore of the unitary locking gasket; said tube being flared outwardly at one end; said tube essentially encased in an elastomeric housing, wherein said elastomeric housing comprises a unitary structure comprising (i) an elastomeric annulus which is beveled inwardly at the flared end of the tube, said annulus encasing the flared end of the tube; (ii) a spigot which is a continuation of the tube beyond the annulus; said spigot being encased in an elastomer and having lesser outer diameter than the outer diameter of the annulus; (iii) a flat annular elastomeric gasket, depending in a generally downward direction from the elastomeric annulus; said annular gasket having a saddle configuration which allows said unitary locking gasket to fit a pipe which has an aperture in the pipe wall through which the spigot passes.

2. A junction coupling for use with a pipe having an aperture in the pipe wall, said coupling comprising a unitary saddle shaped member, said saddle shaped member being dimensioned at least partly to surround said pipe and to cover said aperture wherein said saddle shaped member consists of an inner face which conforms substantially to the outside curvature of said pipe; a central screw-threaded bore which extends through the top of the saddle and into a hub, said hub having a recessed area in its under side to receive a unitary locking gasket as claimed in claim 1, said recessed area being centrally disposed relative to the bore; said hub having at its base and extending laterally therefrom, a flange, said flange containing apertures therethrough to receive fixing and stabilization means for fixing and stabilizing the junction coupling on the pipe.

3. A mechanical pipe connector, said connector comprising a unitary locking gasket; a junction coupling; and a securing means for fixing and stabilizing the connector to a pipe, which pipe has an aperture in its wall, said unitary locking gasket of the combination being fitted to said pipe and a spigot of said unitary locking gasket being centered and fitted into said aperture wherein, the unitary locking gasket comprises a compressable tube which tube forms a center bore of the unitary locking gasket; said tube being flared outwardly at one end; said tube essentially encased in an elastomeric housing, wherein said elastomeric housing comprises a unitary structure comprising (i) an elastomeric annulus which is beveled inwardly at the flared end of the tube, said annulus encasing the flared end of the tube; (ii) a spigot which is a continuation of the tube beyond the annulus; said spigot being encased in an elastomer and having a lesser outer diameter than the outer diameter of the annulus; (iii) a flat annular elastomeric gasket, depending in a generally downward direction from the annulus said annular gasket having a saddle shaped configuration which allows said unitary locking gasket to fit the pipe which has an aperture in the pipe wall through which the spigot is fitted and inserted; said unitary locking gasket being surmounted by a junction coupling, said junction coupling comprising a unitary saddle shaped member, said saddle shaped member being dimensioned at least partly to surround said pipe and to cover said aperture wherein said saddle shaped member consists of an inner face which conforms substantially to the outside curvature of said pipe; a central screw-threaded bore which extends through the top of the saddle and into a hub, said hub having a recessed area in its under side, said recessed area being centrally disposed relative to the bore; said hub having at its base and extending laterally therefrom, a flange, said flange containing apertures therethrough; a fixing and stabilizing means for securing the connector to a pipe.

4. A method of obtaining a leak-proof mechanical pipe connection which method comprises (I) forming an aperture in a pipe;
(II) fitting said aperture with a unitary locking gasket as claimed in claim 1;
(III) surmounting said unitary locking gasket with a junction coupling; said junction coupling comprising a unitary saddle shaped member, said saddle shaped member being dimensioned at least partly to surround said pipe and to cover said aperture wherein said saddle shaped member consists of an inner face which conforms substantially to the outside curvature of said pipe; a central screw-threaded bore which extends through the top of the saddle and into a hub, said hub having a recessed area in its under side, said recessed area being centrally disposed relative to the bore; said hub having at its base and extending laterally therefrom, a flange, said flange containing apertures therethrough to receive a fixing and stabilization means, and
(IV) manipulating the fixing and stabilization means until a leak-proof seal between the unitary locking gasket, the junction coupling and the pipe is obtained.

5. A method as claimed in claim 4 wherein the gasket is first fitted to the pipe and then surmounted by the junction coupling.

6. A method as claimed in claim 4 wherein the gasket is first fitted to the junction coupling and the combination is then fitted to the pipe.

7. A method as claimed in claim 4 wherein the pipe is electrical wire conduit.

8. A method as claimed in claim 7 wherein the conduit is designed for telephone wire.

9. The mechanical pipe connector of claim 3 wherein the center bore through the top of the saddle contains a sprinkler head.

10. The mechanical pipe connector of claim 3 wherein the center bore through the top of the saddle contains a threaded pipe.

11. The mechanical pipe connector of claim 10 wherein the threaded pipe is smaller in diameter than the hub of the junction coupler.

12. The mechanical pipe connector of claim 10 wherein the threaded pipe is larger in diameter than the hub of the junction coupler.

13. A unitary locking gasket as claimed in claim 1 wherein the elastomeric housing is silicone rubber.

14. A unitary locking gasket as claimed in claim 1 wherein the elastomeric housing is organic rubber.

15. A unitary locking gasket as claimed in claim 1 wherein the elastomeric housing is silicone-modified organic rubber.

16. A unitary locking gasket as claimed in claim 15 wherein the silicone modified organic rubber is a blend of silicone rubber and organic rubber.

17. A unitary locking gasket as claimed in claim 15 wherein the silicone modified organic rubber is a copolymer of silicone rubber and organic rubber.

* * * * *